(12) United States Patent
Lynn

(10) Patent No.: US 8,756,104 B2
(45) Date of Patent: Jun. 17, 2014

(54) METHOD AND SYSTEM FOR GENERATING AND DISTRIBUTING ELECTRONIC COMMUNICATIONS FOR MAXIMUM REVENUE

(75) Inventor: Scott W. Lynn, Kansas City, MO (US)

(73) Assignee: Adknowledge Inc., Kansas City, MO (US)

( * ) Notice: Subject to any disclaimer, the term of this patent is extended or adjusted under 35 U.S.C. 154(b) by 0 days.

(21) Appl. No.: 13/585,433

(22) Filed: Aug. 14, 2012

(65) Prior Publication Data

US 2012/0310733 A1    Dec. 6, 2012

Related U.S. Application Data

(63) Continuation of application No. 11/294,188, filed on Dec. 5, 2005, now Pat. No. 8,249,929, which is a continuation-in-part of application No. 10/915,975, filed on Aug. 11, 2004.

(60) Provisional application No. 60/633,483, filed on Dec. 4, 2004.

(51) Int. Cl.
*G06Q 30/00* (2012.01)

(52) U.S. Cl.
USPC ............... 705/14.46; 705/14.4; 705/14.43

(58) Field of Classification Search
USPC ............. 705/14.43, 14.49, 14.73, 14.46
See application file for complete search history.

(56) References Cited

U.S. PATENT DOCUMENTS

| | | | | |
|---|---|---|---|---|
| 6,006,197 | A * | 12/1999 | d'Eon et al. ............... | 705/14.45 |
| 6,595,859 | B2 * | 7/2003 | Lynn ............................. | 463/42 |
| 7,127,261 | B2 * | 10/2006 | Van Erlach ................ | 455/456.5 |
| 7,979,501 | B1 * | 7/2011 | Coleman et al. ............. | 709/207 |
| 2002/0103698 | A1 * | 8/2002 | Cantrell ......................... | 705/14 |
| 2003/0014300 | A1 * | 1/2003 | Franco et al. ................. | 705/10 |
| 2003/0036974 | A1 * | 2/2003 | Allen ............................ | 705/27 |
| 2004/0117213 | A1 * | 6/2004 | Pache et al. ..................... | 705/2 |
| 2004/0249709 | A1 * | 12/2004 | Donovan et al. ............... | 705/14 |
| 2005/0096979 | A1 * | 5/2005 | Koningstein .................. | 705/14 |
| 2005/0197885 | A1 * | 9/2005 | Tam et al. ...................... | 705/10 |
| 2006/0020596 | A1 * | 1/2006 | Liu et al. .......................... | 707/6 |
| 2006/0122883 | A1 * | 6/2006 | Lynn .............................. | 705/14 |
| 2009/0112698 | A1 * | 4/2009 | Steelberg et al. ............. | 705/10 |
| 2010/0114704 | A1 * | 5/2010 | Steelberg et al. .......... | 705/14.54 |
| 2012/0197739 | A1 * | 8/2012 | Steelberg et al. .......... | 705/14.73 |

OTHER PUBLICATIONS

IBM Infosphere Discovery Information (IBM); "What is a Data Object?"; Jul. 28, 2011; file WhatIsDataObject28jul2011.pdf.*
Burns, Janet; non-patent literature search performed Nov. 6, 2012; file name: 13585433-405966-EIC3600 Search Results.*

* cited by examiner

*Primary Examiner* — John G Weiss
*Assistant Examiner* — Adam Chornesky
(74) *Attorney, Agent, or Firm* — Meunier Carlin & Curfman, LLC

(57) ABSTRACT

Systems and methods are disclosed for providing content in accordance with informational campaigns or advertisements administered by one or more distribution partners. the distribution partners typically revenue share with the system administrator (system owner), who coordinates the informational campaigns and sends electronic mails (e-mails) associated therewith. By applying a distribution optimization formula to various informational or advertising campaigns of the distribution partners, e-mails with links to these distribution partners will be sent to users, and each user who opens the e-mail and clicks on a portion of the e-mail over an underlying link, will be directed to the requisite distribution partner, typically the server associated therewith.

14 Claims, 12 Drawing Sheets

| CAMPAIGN ID (CID) | KEYWORD(KW) | DISTRIBUTION PARTNER(DP) | PPC | ADPOS |
|---|---|---|---|---|
| CID1 | VACATION(KW1) | DP2 | 1.00 | 1 |
| CID1 | VACATION TRAVEL(KW3) | DP1 | 0.90 | 1 |
| CID1 | VACATION (KW1) | DP1 | 0.80 | 1 |
| CID1 | HOTEL(KW2) | DP3 | 0.70 | 1 |
| CID1 | VACATION (KW1) | DP4 | 0.60 | 1 |
| CID1 | VACATION (KW1) | DP2 | 0.50 | 2 |

FIG.7A

| CAMPAIGN ID (CID) | KEYWORD(KW) | DISTRIBUTION PARTNER(DP) | PPC | ADPOS |
|---|---|---|---|---|
| CID1 | HOTEL(KW2) | DP3 | 0.70 | 1 |
| CID1 | VACATION(KW1) | DP2 | 1.00 | 1 |

FIG.7B

METHOD AND SYSTEM FOR GENERATING AND DISTRIBUTING ELECTRONIC COMMUNICATIONS FOR MAXIMUM REVENUE

CROSS REFERENCES TO RELATED APPLICATIONS

This application is a continuation of commonly owned U.S. patent application Ser. No. 11/294,188, entitled: Method and System for Generating and Distributing Electronic Communications for Maximum Revenue, filed Dec. 5, 2005, and published as U.S. Patent Application Publication No. US 2006/0122883 A1, now U.S. Pat. No. 8,249,929, which is related to and claims priority from U.S. Provisional Patent Application Ser. No. 60/633,483, entitled: Process and Method of Distribution Optimization Over a Network Based on Keywords, filed Dec. 4, 2004. This application is a continuation application of commonly owned U.S. patent application Ser. No. 11/294,188, now U.S. Pat. No. 8,249,929, which is a continuation in part application of commonly owned U.S. patent application Ser. No. 10/915,975, entitled: Method and System for Generating Electronic Communications, filed Aug. 11, 2004, and published as U.S. Patent Application Publication No. US 2005/0038861 A1. U.S. patent application Ser. No. 11/294,188, and U.S. Patent Application Publication No. US 2006/0122883 A1, U.S. Provisional Patent Application Ser. No. 60/633,483, U.S. patent application Ser. No. 10/915,975, and U.S. Patent Application Publication No. US 2005/0038861 A1 are all incorporated by reference herein.

FIELD OF THE INVENTION

The present invention relates to content delivery over networks and components associated therewith. In particular, the invention is directed to methods for selecting at least one data object from multiple data objects, that will maximize revenue for a keyword or a combination of keywords, associated with the multiple data objects, and delivering a link to the specific data object, that will generate maximum revenue at a particular time, to an intended recipient, typically through an electronic mail (e-mail), other electronic communication, or means of electronic content display. The link will direct the browser associated with the recipient or user, to the desired server of or associated with a content provider, who in turn, directs the recipient's (or user's) browser to the targeted web site (also spelled "website", both forms being interchangeable, the same holding true for plural forms) associated with the specific data object.

BACKGROUND OF THE INVENTION

Electronic information distribution, for example, advertising, over networks, such as the Internet, continues to increase. This increase is expected to continue over the coming years, as increasing numbers of people have access to computers, and therefore, the World Wide Web (WWW). Accordingly, advertisers are allocating increasing amounts of resources, including manpower and money, into Internet advertising.

Contemporary Internet advertising takes various forms. For example, an advertiser may own or secure access to a web site or web page, collectively, a "web site" and post advertising on this web site. A user accesses this web site by obtaining the web site address, typically a uniform resource locator (URL), through general knowledge or a search engine. The user either manually enters the known address into his web browser, or clicks on a link that will direct his web browser to the web site.

The user may also enter words or groups of words into a search engine. The entered word or words may be keywords that are assigned to data objects for the desired products, services or other items of information. The user then receives listings for web sites with links, that when clicked, will direct the user's browser to the corresponding web site.

Alternatively, an advertiser will actively seek customers, who will respond to the advertiser by directing their web browsers to the advertiser's web site. For example, an advertiser may send an electronic communication, such as an electronic mail (e-mail), to a recipient, for example, a potential customer. Once the e-mail is opened, it includes a link, that when clicked, directs the user's browser to a particular web site.

Banner advertising involves banners that cover links for advertiser's targeted Web sites. The banners are either placed onto a web page and are part of the page, or are alternated over time. Banners can also pop-up, roll up or otherwise appear during the time the web page is on the screen (monitor) of the user. These banners are such that a user can click on the banner that is linked to a web site, and once clicked, the web browser of the user will be directed to the targeted web site.

Advertisers, or agents of advertisers, typically offer fees for placement of their advertisements on web pages or other electronic communications based on success of the advertisement. For example, an advertisement is considered a success when a user has clicked on the desired banner, or other component linked to the targeted web site, such that the click directs the user's browser to the targeted web site, associated with, owned or controlled by the advertiser.

Fees are also offered when keywords are used to obtain listings of advertisers. Listings of advertisers for each keyword are typically placed in a prioritized order, with the priority normally based on an amount that an advertiser will pay when a user clicks on the listing, and through a link associated with the listing, the user's browser is directed to the a targeted web site associated with, owned, or controlled by the advertiser. These listings are typically produced by Internet search engines. Advertising in this manner is commonly referred to as pay-per-click (PPC), cost per click, or PPC advertising.

These contemporary advertising methods exhibit drawbacks, in that they do not address methods for maximizing revenue in directing the recipient's or user's browser to a targeted web site. Moreover, each advertiser, or the agent of an advertiser, may offer a different fee and different terms for successful placement or distribution of its advertisement(s). The terms of advertising contracts in the Internet advertising industry may have a number of inputs which make assessment of multiple offers difficult, particularly where the volume of contracts and volume of advertisements displayed are all large, and decisions must be made very quickly.

SUMMARY

This document references terms that are used consistently or interchangeably herein. These terms, including variations thereof, are as follows.

The term "click", "clicks", "click on", "clicks on" involves the activation of a computer pointing apparatus, such as a device commonly known as a mouse, on a location on a computer screen display, that causes an action of the various software and or hardware supporting the computer screen display.

A "web site" is a related collection of World Wide Web (WWW) files that includes a beginning file or "web page" called a home page, and typically, additional files or "web pages". The term "web site" is used collectively to include "web site" and "web page(s)".

A uniform resource locator (URL) is the unique address for a file, such as a web site or a web page, that is accessible on the Internet.

A server is typically a remote computer or remote computer system, or computer program therein, that is accessible over a communications medium, such as the Internet, that provides services to other computer programs (and their users), in the same or other computers.

Pay Per Click (PPC), also known as price per click and cost per click, as used herein, is the amount of money that an advertiser web site promoter, or other party who owns or is associated with a web site, will pay to a system administrator for providing their advertisement, listing, link or the like to a user, and the user clicks their mouse or pointing device on the advertisement, listing, link or the like, such that the user's browser is directed to the targeted web site associated with the advertiser, web site promoter, or other party who owns or is associated with the targeted web site.

The present invention overcomes the drawbacks of contemporary information distribution systems and methods, by distributing e-mail and other digital data in accordance with criteria that will maximize revenue to the party distributing the information or advertisements. The present invention is directed to methods for maximizing the revenue generated from distributing advertisements or other information items from keyword distribution partners, commonly known as distribution partners or keyword agencies. The distribution partners are businesses that administer and distribute advertisements or other information items, typically associated with one or more keywords, of advertisers or information providers, who for a fee, typically a portion of the pay per click (PPC) amount the advertiser will pay, will drive traffic to the advertiser's Web site.

When a company advertises with a distribution partner, the advertiser agrees in a contract to pay a fee in exchange for the distribution of its advertisements over the Internet. Traditionally, Internet advertising industry convention requires the advertiser to compensate administrators of systems that provide advertisements to users on a pay per click (PPC) basis. Distribution partners may negotiate contracts with different advertisers, typically taking a percentage of the PPC amount, for distributing the requisite advertisement(s) of each specific advertiser. At the same time, the distribution partners are building up an inventory of advertisements which need to be distributed over the Internet, according to the terms in each contract. The resulting advertisement inventory can be used within graphical advertisements on the Internet such as banners, in email and on software which displays advertisements.

The present invention pools the advertising inventory of one or more distribution partners, fostering wider channels for distributing their advertisements, of individual advertisers. The present invention also provides a maximum revenue distribution optimization formula for distributing advertisement listings (Internet links or data that will include an internet link, into advertisements and other information, typically stored at an advertiser's or content provider's web site) to users, such that advertisements that will yield the maximum amount of revenue, typically from a pool of one or more distribution partners.

An embodiment of the invention is directed to a method for directing a user to at least one data object. The method includes providing a plurality of listings of at least one entity, for example an advertiser associated with a web site, each of the listings associated with at least one keyword, the plurality of listings administered by at least one distribution partner, and is accessible from at least one first server of the at least one distribution partner. Each of the listings includes data for directing the browser of a user to the at least one second server of the distribution partner from whom the listing was provided. Data is then received from at least one user, the data from an electronic communication associated with the at least one user, the data for accessing at least one campaign identifier, and, the at least one campaign identifier is associated with the at least one keyword. At least one listing, from the plurality of listings corresponding to the at least one keyword, is provided to the electronic communication, the electronic communication accessible by the user. The at least one first server of the at least one distribution partner, and the at least one second server of the at least one distribution partner may be the same or different servers.

Another embodiment of the invention is directed to a method for directing a user to at least one data object. The method includes receiving input from at least one user who received an electronic communication for activating data corresponding to the at least one keyword; polling at least one distribution partner for listings corresponding to the at least one keyword and obtaining a plurality of listings corresponding to the at least one keyword, each of the listings including at least one link, that when activated, directs the browser of the user to the at least one data object; determining a predetermined number of the plurality of listings that will provide the maximum revenue; providing the electronic communication associated with the at least one user with at least one listing of the plurality of listings that will provide the maximum revenue; and, directing the browsing application of the at least one user to the at least one data object corresponding to at least one listing of the predetermined number of listings that will provide maximum revenue, when an indicator is received that the link in the at least one listing has been activated.

Another embodiment of the invention is directed to a method for directing at least one user to a targeted data object. The method includes, sending an electronic communication activatable by a user, to at least one user, the electronic communication including data associated with at least one identifier, the at least one identifier associated with at least one keyword. At least a portion of the data associated with the at least one identifier from the at least one user, is received, indicating that the electronic communication has been activated. At least one distribution partner is polled for listings in accordance with at least one keyword corresponding to the at least one identifier, each of the listings including at least one activatable link to direct the browser of a user to at least one data object associated with the link. The electronic communication, for example, an e-mail or a banner, is provided with a predetermined number of listings.

Another embodiment of the invention is directed to a method for managing content provided to electronic communications. The method includes, electronically maintaining at least one database of campaign identifiers; electronically maintaining a database of at least one keyword for each of the campaign identifiers; and, electronically maintaining a database of listings, the listings obtained from at least one distribution partner based on the at least one key word of the corresponding campaign identifier, each of the listings including at least one activatable link to direct the browser of a user to at least one data object associated with the link. The listings are then ordered in accordance with at least one predetermined criteria, for example, maximum revenue; and, a predetermined number of the listings are provided to an electronic communication upon receiving at least one indication that the electronic communication has been activated by at least one user. The electronic communication may be, for example, an electronic mail, a banner, or the like.

Another embodiment of the invention is directed to a system for directing a user to at least one data object. The system includes five components. There is a first component for receiving input from at least one user who received an electronic communication for activating data corresponding to the at least one keyword. A second component polls at least one distribution partner for listings corresponding to the at least one keyword and obtains a plurality of listings corresponding to the at least one keyword, each of the listings including at least one link, that when activated, directs the browser of the user to the at least one data object. A third component is for determining a predetermined number of the plurality of listings that will provide the maximum revenue. A fourth component is for providing the electronic communication associated with the at least one user with at least one listing of the plurality of listings that will provide the maximum revenue. A fifth component directs the browsing application of the at least one user to the at least one data object corresponding to at least one listing of the predetermined number of listings that will provide maximum revenue, when an indicator is received that the link in the at least one listing has been activated.

Still another embodiment of the invention is directed to a system for directing at least one user to a targeted data object. The system includes four components. A first component is for sending an electronic communication activatable by a user, to at least one user, with the electronic communication including data associated with at least one identifier, for example, a campaign identifier (CID), and the at least one identifier is associated with at least one keyword. There is a second component for receiving at least a portion of the data associated with the at least one identifier from the at least one user, indicating that the electronic communication has been activated. There is a third component for polling at least one distribution partner for listings in accordance with at least one keyword corresponding to the at least one identifier, each of the listings including at least one activatable link to direct the browser of a user to at least one data object associated with the link. There is a fourth component for providing the electronic communication with a predetermined number of listings.

Yet another embodiment of the invention is directed to a system for managing content provided to electronic communications. The system includes, a first database of campaign identifiers; a second database of at least one keyword for each of the campaign identifiers; and, a third database of listings. The listings are obtained from at least one distribution partner based on the at least one key word of the corresponding campaign identifier, and each of the listings includes at least one activatable link to direct the browser of a user to at least one data object associated with the link. There is a first component for ordering the listings in accordance with at least one predetermined criteria, and, a second component for providing a predetermined number of the listings to an electronic communication upon receiving at least one indication that the electronic communication has been activated, for example an electronic mail has been opened, or a banner clicked on, by at least one user, who received the electronic communication.

Another embodiment is directed to a computer usable storage medium. The computer usable storage medium has a computer program embodied thereon for causing a suitably programmed system to direct a browsing application to at least one data object by performing the following steps when such program is executed on the system. The steps include, providing a plurality of listings of at least one entity, each of the listings associated with at least one keyword, the plurality of listings administered by at least one distribution partner and are accessible from at least one first server of the at least one distribution partner. Each of the listings includes data for directing a browsing application to the at least one second server of the distribution partner from whom the listing was provided. Another step includes, receiving data from at least one user, the data from an electronic communication, for example, an electronic mail, associated with the at least one user, the data for accessing at least one campaign identifier, and the at least one campaign identifier is associated with the at least one keyword. In another step, at least one listing, from the plurality of listings corresponding to the at least one keyword, is provided to the electronic communication, the electronic communication accessible by the user.

Another embodiment of the invention is directed to a computer usable storage medium. The computer usable storage medium has a computer program embodied thereon for causing a suitably programmed system to direct a browsing application to at least one data object by performing the following steps when such program is executed on the system. The steps include, sending an electronic communication, for example, an electronic mail, activatable by a user, to at least one user, the electronic communication including data associated with at least one identifier, and the at least one identifier is associated with at least one keyword. At least a portion of the data associated with the at least one identifier from the at least one user, is then received, indicating that the electronic communication has been activated. At least one distribution partner is polled (queried) for listings in accordance with at least one keyword corresponding to the at least one identifier, each of the listings includes at least one activatable link to direct the browser of a user to at least one data object associated with the link. The electronic communication is then provided with a predetermined number of listings.

BRIEF DESCRIPTION OF DRAWINGS

Attention is now directed to the drawings, where like reference numerals or characters indicate corresponding or like components. In the drawings:

FIG. 7A is a first list generated in accordance with an embodiment of the invention;

FIG. 7B is a reordered list of FIG. 7A generated in accordance with an embodiment of the invention;

DETAILED DESCRIPTION OF THE DRAWINGS

The present invention is related to systems and methods for delivering electronic content over a network, such as the Internet, for example, through electronic mail (commonly known as e-mail), banner advertisements, or other means of electronic display. The content is provided in accordance with informational campaigns or advertisements administered by one or more distribution partners, who typically revenue share with the owner of the home server (system administrator), who coordinates the informational campaigns and sends the e-mails associated therewith. By applying a distribution optimization formula to various informational or advertising campaigns of the distribution partners, e-mails with links to these distribution partners will be sent, and each user, who opens the e-mail and clicks on a portion of the e-mail over an underlying link, will be directed to the requisite distribution partner, typically the server associated therewith. The server of the distribution partner will then redirect the browser of the user to a targeted web site associated with advertiser party in charge of or associated with the requisite information provider.

Throughout this document, textual and graphical references are made to fictional trademarks as well as Internet addresses (Uniform Resource Locators, also known as URLs). These trademarks and Internet addresses are fictitious and for explanation purposes only, and any association with any party or other entity is coincidental, unintentional and unrelated thereto. Additionally, throughout this document, numerous textual and graphical references are made to trademarks. These trademarks are the property of their respective owners, and are referenced only for explanation purposes herein.

Figure 1:
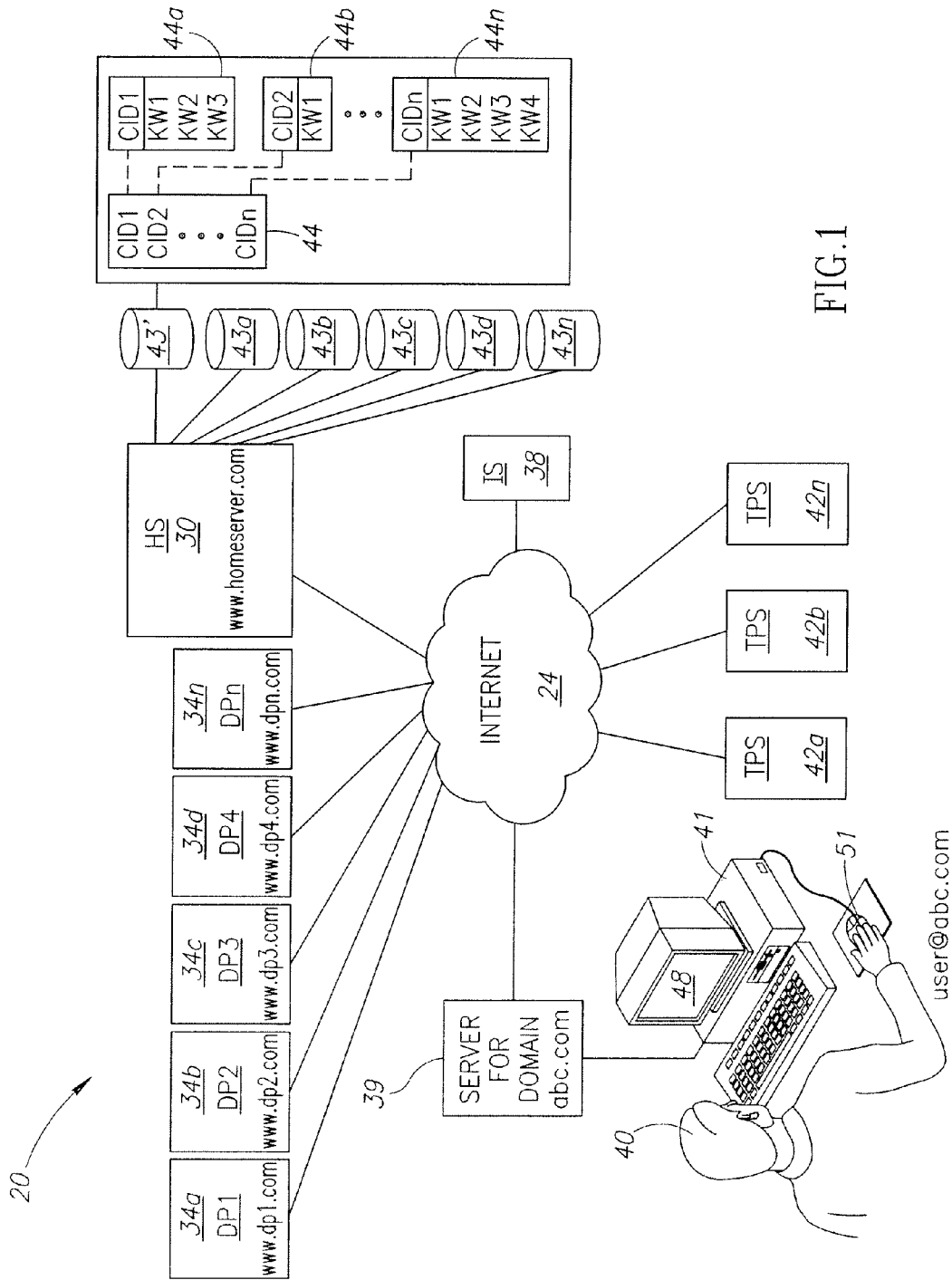
FIG. 1 is a diagram of an exemplary system on which an embodiment of the invention is performed.

FIG. 1 shows the present invention in an exemplary operation. The present invention employs a system 20, formed of various servers and server components, that are linked to a network, such as a wide area network (WAN), that may be, for example, the Internet 24.

There are, for example, at least three kinds of servers that form the system 20. These servers typically include a Home Server (HS) 30, one or more servers (DP) 34a-34n associated with distribution partners, and an imaging server (IS) 38. These servers 30, 34a-34n and 38 are linked to the Internet 24, so as to be in communication with each other. The servers 30, 34a-34n and 38 include multiple components for performing the requisite functions as detailed below, and the components may be based in hardware, software, or combinations thereof. The servers 30, 34a-34n and 38 may also have internal storage media and/or be associated with external storage media.

The servers 30, 34a-34n, 38 of the system 20 are linked (either directly or indirectly) to an endless number of other servers and the like, via the Internet 24. Other servers, exemplary for describing the operation of the system 20, include a domain server 39 for the domain (for example, the domain "abc.com") of the user 40 (for example, whose e-mail address is user@abc.com), linked to the computer 41 of the user. Still other servers may include third party servers (TPS) 42a-42n, controlled by content providers, web site promoters, and the like. The advertising or informational campaigns of these entities is typically administered by distribution partners (DPs), as represented by servers 34a-34n.

While various servers have been listed, this is exemplary only, as the present invention can be performed on an endless numbers of servers and associated components, that are in some way linked to a network, such as the Internet 24. Additionally, all of the aforementioned servers include components for accommodating various server functions, in hardware, software, or combinations thereof, and typically include storage media, either therein or associated therewith. Also in this document, the aforementioned servers, storage media, and components can be linked to each other or to a network, such as the Internet 24, either directly or indirectly.

The Home Server (HS) 30 is of an architecture that includes components, modules and the like, for handling electronic mail, to perform an electronic mail (e-mail) server functionality, including e-mail applications. The architecture also includes components for providing numerous additional server functions and operations, for example, comparison and matching functions, policy and/or rules processing, various search, distribution optimization functions (as detailed below) and other operational engines. The Home Server (HS) 30 includes various processors, including microprocessors, for performing the aforementioned server functions and operations and storage media, either internal or associated therewith, such as caches 43', and 43a-43n. The caches may include databases and other data structures for data storage and manipulation.

While caches 43', and 43a-43n and databases are shown, this is exemplary only, for explanation purposes. The Home Server (HS) 30 may be associated with additional caches, databases, as well as numerous other additional storage media, both internal and external thereto.

For example, the cache 43' may be divided into portions, or databases 44 and 44a-44n. The database 43' may be used to store campaign identifiers (CIDs), for example CID1 to CIDn, shown in the database 44. Each campaign identifier (CID1-CIDn) is linked to at least one database 44a-44n, that stores one or more keywords (KW1-KWn), associated with each campaign identifier (for each informational, typically advertising, campaign). A keyword is a word or group of words, such as a phrase, or other suitable identifier for one or more data object(s).

For example, Campaign Identifier 1 (CID1) may be for the campaign "Vacations", formed of Keywords, "VACATION" for Keyword 1 (KW1), "HOTEL" for Keyword 2 (KW2) and "VACATION TRAVEL" for Keyword 3 (KW3). Campaign Identifier 2 (CID2) may be for the campaign "AUTOMOBILES", with Keyword 1 (KW1), the only keyword for this campaign being "NEW CARS."

The Home Server (HS) 30 composes and sends e-mails to intended recipients (for example, e-mail clients hosted by a computer, workstation or other computing device, etc., associated with a user), over the network, typically a wide area network (WAN), such as the Internet. The home server (HS) 30 receives requests sent from the e-mail clients associated with the computer of a user. The e-mail clients may be, for example, America Online® (AOL®), Outlook®, Eudora®, or other web-based clients. In this document, the client is an application that runs on a computer, workstation or the like and relies on a server to perform some operations, such as sending and receiving e-mail. Also, for explanation purposes, the Home Server (HS) 30 may have a uniform resource locator (URL) of, for example, www.homeserver.com. The process of sending the request from the home server (HS) 30 and returning the request to the home server (HS) 30, is further detailed below.

For example, the intended recipient or user 40 has a computer 41 (such as a multimedia personal computer with a Pentium® CPU, that employs a Windows® operating system), that uses an e-mail client. The computer 41 is linked to the Internet 24. This Home Server (HS) 30 typically employs one or more engines in order pull the designated data, corresponding to the designated informational campaign from the server 34a-34n of the requisite distribution partner (DP). While a single Home Server (HS) 30 is shown, the Home Server (HS) 30 may be formed of multiple servers and/or components, and may also be formed from still other servers with e-mail functionalities, as well as for performing other functionalities described herein.

Servers of the Distribution Partners (DP) 34a-34n (one or more) are also linked to the Internet 24. These servers 34a-34n provide content, typically in text form, for the imaging server (IS) 38, typically through the Home Server (HS) 30, and typically, in response to a request from the Home Server (HS) 30, based on a designated campaign identifier (CID) and its corresponding keyword(s). These servers of the Distribution Partners (DP) 34a-34n may be, for example, Pay-Per-Click (PPC) servers of various content providers, such as internal providers, or external providers.

At least one imaging server (IS) 38 is linked to the Internet 24. The imaging server (IS) 38 functions to convert text (data in text format) from the servers of the distribution partners (DP) 34a-34n, as received through the Home Server (HS) 30, to an image (data in an image format). After conversion into an image, the image is typically sent back to the Home Server (HS) 30, to be placed into an e-mail opened by the user 40, as detailed below. Alternately, the imaging server (IS) 38 may send the image directly to the e-mail client associated with the user 40, over the Internet 24.

Figure 2:
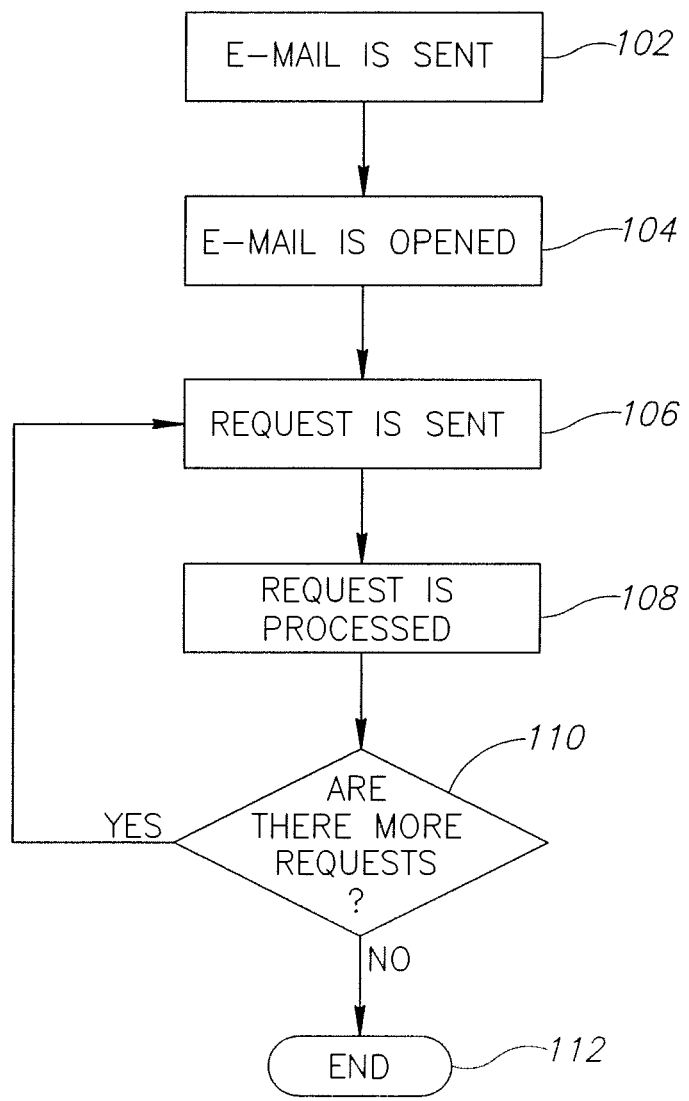
FIG. 2 is a flow diagram of a process for generating the content for an e-mail in accordance with an embodiment of the invention.

Turning also to FIG. 2, an exemplary implementation of a process in accordance with an embodiment of the present invention will now be described. FIG. 2 is a flow diagram of the process (method). The process of FIG. 2 may be the first phase of a larger process, and is in accordance with the process disclosed in commonly owned U.S. patent application Ser. No. 10/915,975 (and U.S. Patent Application Publication No. US 2005/0038861 A1).

For example, the first phase may involve rendering an e-mail to an e-mail client, while the second phase, shown in FIG. 10 and detailed below, is dependent on the first phase. The second phase directs the user to the distribution partner (DP), represented by servers 34a-34n, and typically ultimately to a target web site for whom the distribution partner is administering the web site owner/operator's informational (typically advertising) campaign. For explanation purposes, each server 34a-34n, associated with the corresponding distribution partner, Distribution partner 1 (DP1) to Distribution partner n (DPn) has a URL for the corresponding server 34a-34n, such that for Distribution Partner 1 (DP1) of server 34a, the URL is www.dp1.com, for Distribution Partner 2 (DP2) of server 34b, the URL is www.dp2.com, and so on, through Distribution Partner n of server 34n, the URL is www.dpn.com. The user is directed to the distribution partner's server 34a-34n or other designated web site, via a link, that is activated once the user has clicked his mouse 51 on the dynamically rendered image or a portion thereof, of the opened e-mail, that is paired with the link.

Initially, the computer 41 of the user 40 includes an e-mail client (detailed above), installed thereon, that provides the user with a unique access and the ability to utilize one or more e-mail addresses. For example, the user 40 has an e-mail address, user@abc.com, through which he receives his e-mail from the domain server 39, that hosts the domain abc.com, of which the user 40 is a member. The computer 41 also includes a web browser, browsing software, application, or the like, to access web sites or web pages from various servers and the like, on the Internet 24. Some exemplary web browsers/web browsing software include, Internet Explorer®, from Microsoft, Redmond, Wash., and Netscape® Navigator®.

An e-mail is sent to the e-mail client associated with the computer 41 of the user 40, typically from the Home Server (HS) 30, at block 102. This initially or first sent e-mail, for explanation purposes, is referred to as the "sent e-mail".

The sent e-mail may be, for example, in Hypertext Markup Language (HTML), and may include one or more Hypertext Transport Protocol (HTTP) source requests. These HTTP source requests typically reference the Home Server (HS) 30.

The sent e-mail includes three main parts. These parts include, for example, a program for the body of the e-mail when it is opened, data identifying a campaign identifier (CID), typically in a database of the Home Server (HS) 30, and one or more requests.

Figure 3:
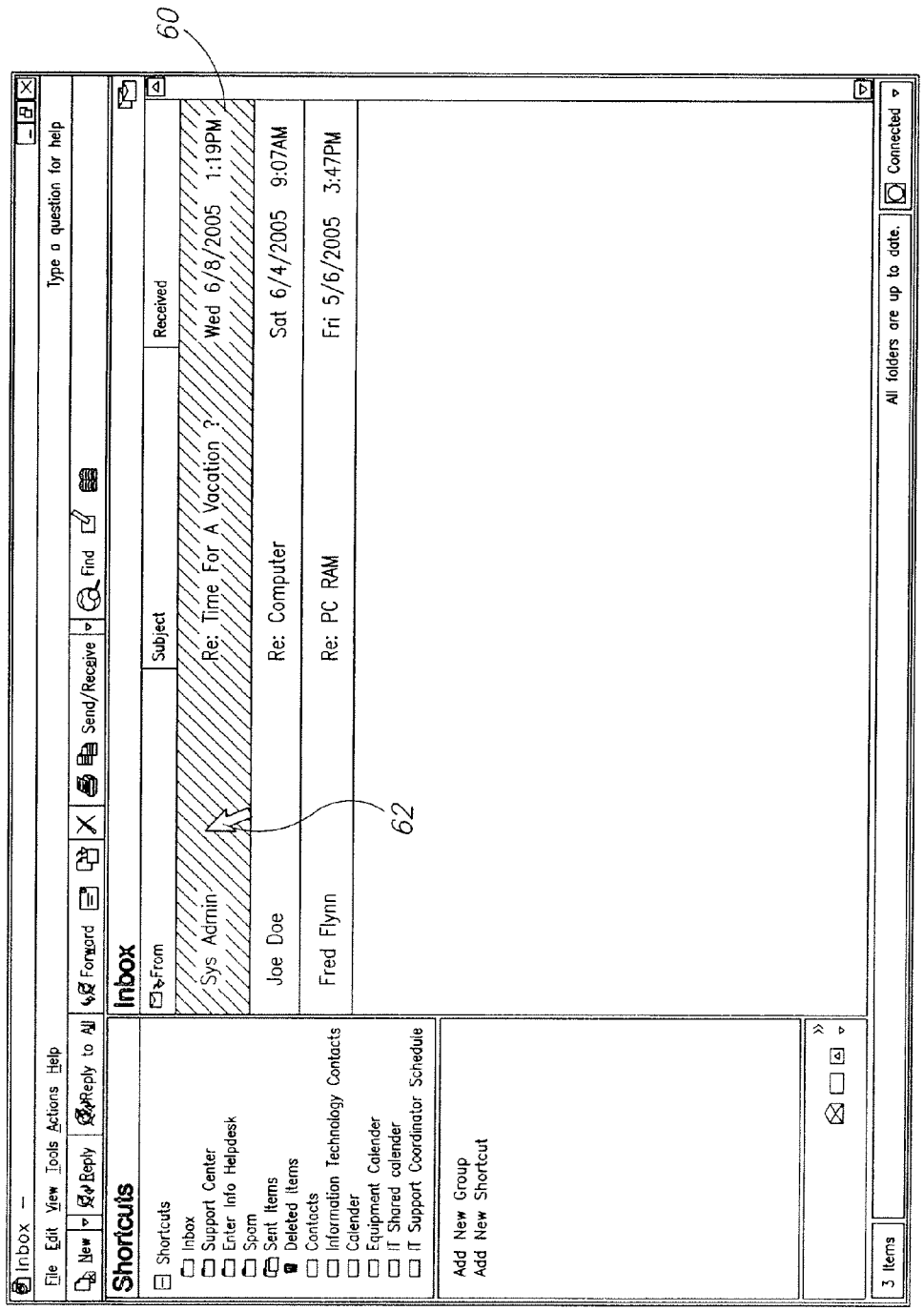
FIG. 3 is a screen shot showing e-mail communications in the mailbox of a recipient.

The sent e-mail includes a program that provides the body of the e-mail when the e-mail is opened. The program provides a template (FIG. 4), that forms the basic structure or framework for the image(s) of the sent and opened e-mail, and, zero or more HTTP Source requests for zero or more static images. The sent e-mail may also include HTML constructs and text, such as plain text, HTML headers, list constructs and the like. The sent e-mail, as received by the e-mail client, typically appears on the screen (monitor) 48 of the user's computer as a line of text 60 (shown as shaded for emphasis only) identifying the sender, subject and other information, as shown in FIG. 3.

The sent e-mail typically includes one or more requests. The total number of request(s) is represented by "N". A single request typically corresponds to a single image to be rendered (into the template of the e-mail image) when the e-mail is opened by the user 40 (as detailed below).

Each of the one or more requests in the e-mail may include data (or data elements) such as: a) a unique identifier (ID); b) at least one campaign identifier (CID), or data corresponding to the at least one campaign identifier (CID); c) a mailing identifier (ID); d) position data, represented herein as POS; and, e) a max number, corresponding to the maximum number of images (represented in this document by "N") that will be dynamically generated and rendered for this particular e-mail.

Each of the one or more requests in a sent e-mail typically includes all five of these data elements. However, if there is only a single request in a sent e-mail, position data is typically not included, because there is only one position for the dynamically generated text in the request (and the max number is 1).

The unique identifier, also known as a user identifier (ID), may be, for example, an e-mail address for the recipient of the sent e-mail, or any other data that guarantees uniqueness for the particular sent e-mail (and its corresponding returned request(s)). A unique identifier is attached to each particular user.

The campaign identifier (CID) has been described above, and is linked to a database or other storage device, to retrieve the keyword(s) assigned to each campaign identifier (CID), typically by the system administrator or the like. It is the retrieved keyword(s) that will be used to obtain the data objects from the servers (DP) 34a-34n of the requisite distribution partners, that form the content for the dynamically generated portions of the e-mail.

The mailing identifier (ID) is a sequence of characters indicative of the batch from which the particular e-mail was sent. For example, a mailing identifier may be a sequence of numbers.

The position data is data indicative of the location in the template where the image (that is generated dynamically) corresponding to that particular request is to be rendered (placed or located). For example, if the e-mail to be rendered has two locations where two separate requests are to be rendered, the first location will be represented by POS=1, while the second location will be represented by POS=2.

The max number is typically equal to N. This is because each request typically results in a single image being dynamically generated to a corresponding position in the template.

When e-mail (the sent e-mail) is downloaded by the e-mail client of the user 40, the e-mail client opens a connection or "pipe" to the Home Server (HS) 30. The e-mail client associated with the user 40, pulls data from the Home Server (HS) 30, and may pull data asynchronously. The data pulled from the Home Server (HS) 30 includes data required to display the resultant dynamically generated text (in the form of images), for example, a template 150, as shown in FIG. 4, and the single or multiple requests.

At block 104, the user 40 opens this e-mail, typically by clicking the mouse 51 (of the computer 41), or activates a similar pointing device, as shown by the arrow 62, anywhere along the line 60, that represents the sent e-mail as received in the user's mail box, as shown in FIG. 3. This opening, for purposes of explanation herein, occurs at a time indicated as $t_1$ (a time once the e-mail client has received the e-mail from the home server (HS) 30). Pulling of data from the Home Server (HS) 30 by the e-mail client is continuous, as long as requests are being processed, as described below.

Figure 4:
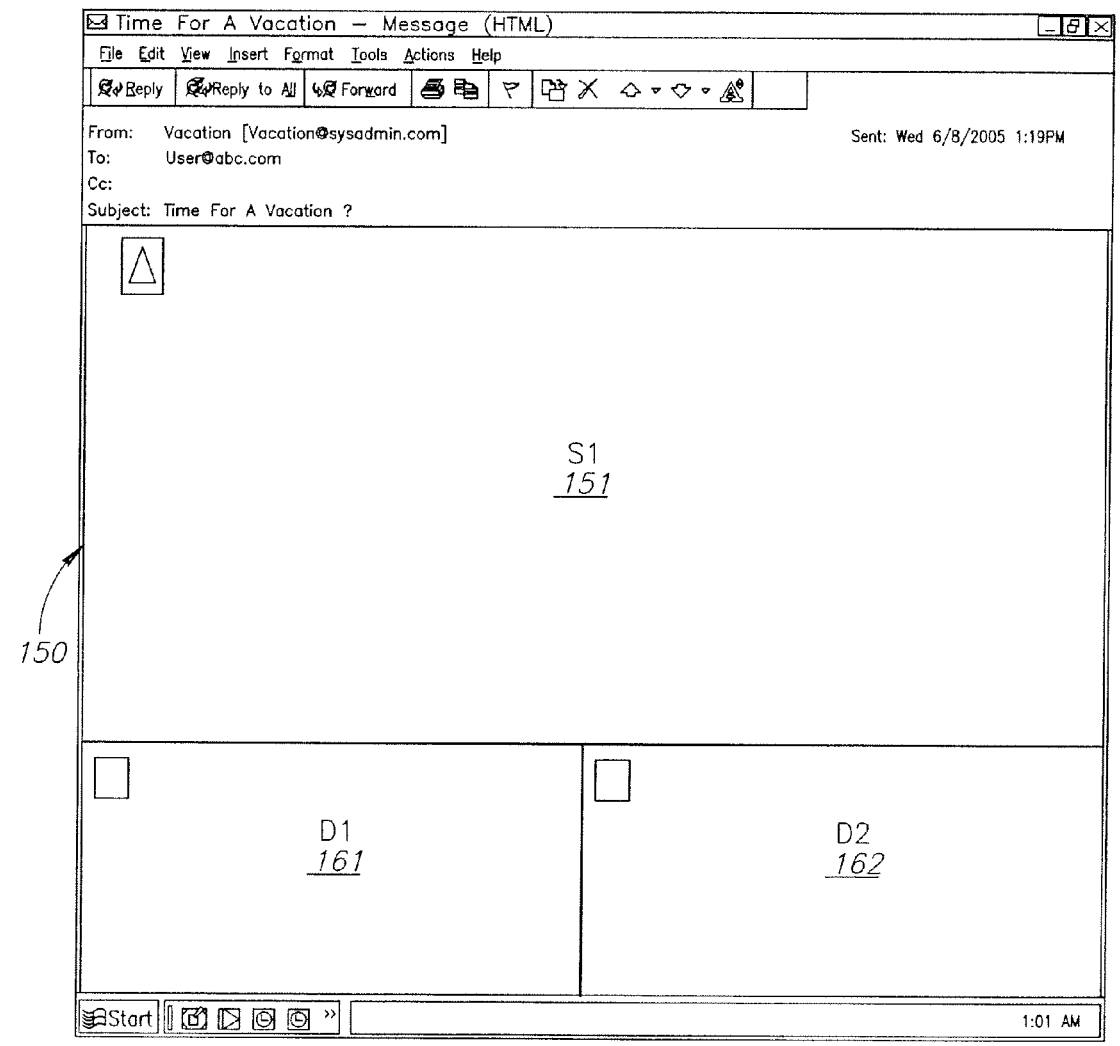
FIG. 4 is a screen shot of an exemplary template in accordance with an embodiment of the invention.

Turning to FIG. 4, an exemplary template 150, that forms part of the body of the opened e-mail, is built out in three sections 151, 161 and 162. A first section S1 151 is designed to receive a static image, having content that is fixed prior to the time the e-mail was sent. The image for the section S1 151 is typically pulled from the Home Server (HS) 30 along with the template 150, when the e-mail is opened, as detailed above.

Sections D1 161 and D2 162, for example, are designed to receive the dynamically generated images, that are generated and assembled when and only if the e-mail is opened. Section D1 161, for example, is the first position for the dynamically generated images, and as such, receives the image from the first listing of the listing text (described below), resulting from the first request being processed; this first request, for example, has position data (POS=1) corresponding to this first position. Similarly, Section D2 162, for example, is the second position for the dynamically generated images, and as such, receives the image from the second listing of the listing text (described below), resulting from the second request being processed; this second request, for example, has position data (POS=2) corresponding to this second position.

With the connection or pipe now opened, a request, known as the "sent back request", based on the request in the sent e-mail, is sent from the e-mail client (associated with the computer 41 of the user 40) to the home server (HS) 30, at block 106. The sent back request includes portions of, and typically all of, the request of the sent e-mail. For example, each sent back request is typically formed from data or data elements including: a) a unique identifier, b) a campaign identifier (CID), c) a mailing identifier, d) position data, and, e) a max number.

The Home Server (HS) 30 receives each request, one at a time, for processing, at block 108. The sub process associated with processing the request are described in detail below, with respect to FIG. 5. The result of each processed request includes obtaining campaign identifier (CID) and its keyword(s) from a cache 43' followed by obtaining text from servers (DP) 34a-34n of the distribution partners, based on the keyword(s) and max number associated with the request. The home server (HS) 30 then organizes the data (text) received from the servers 34a-34n of the distribution partners, and assembles the text in an order in accordance with rules and policies programmed into the home server (HS) 30, for example, a distribution optimization formula, detailed below.

For example, each server 34a-34n of the distribution partners (DP) for a particular informational or advertising campaign, rank their content on a Pay Per Click (PPC) basis. In accordance with PPC rankings, listings are arranged in accordance with bid amounts that an advertiser, web site promoter, or the like, will pay to the owner or administrator (Collectively, the owner) of the administration server, for example, the home server (HS) 30, should the user click on a link that will direct the user's browser to a target Web site, associated with the web site promoter, advertiser, or the like, who bided for the requisite position with the owner of the administration server. Within each of the servers 34a-34n of the Distribution Partners (DP), the rankings, and accordingly, the positions of the advertisements or data corresponding thereto (text data) as associated with each keyword, or "ADPOS" (detailed below), as administered by the servers 34a-34n of the distribution partners, may change. The position changes are in accordance with the rules and policies of the particular distribution partner (DP).

Text (text data) is obtained from the requisite server (DP) 34a-34n, as the home server (HS) 30 pulls numerous listings, but ultimately only using the number of listings corresponding to N requests, from the servers (CS) 34a-34n. The N pulled listings are placed into a cache 43c, associated with the home server (HS) 30, as detailed below.

The home server (HS) 30 sends this data (e.g., in text form) to the imaging server (IS) 38, that generates an image(s) corresponding to the received data (text data). This generated image is returned to the e-mail client of the user, for placement into the template 150, in the position corresponding to the number of the request. For example, the first request would be placed at position D1 (corresponding to POS=1) in the e-mail template 150, while the text corresponding to the second request would be placed into the template 150 at the second position D2 (corresponding to POS=2). The aforementioned data transfers may occur over previously opened and/or existing connections or pipes in the Internet 24 (network).

In the case of an HTTP request, the generated image is sent back to the e-mail client associated with the user 40, through the open connection or pipe. Alternately, for non-HTTP requests, the Home Server (HS) 30 could generate one or more new open connections or pipes, that are different than the previously existing connections or pipes over which the request was sent to the Home Server (HS) 30. It is over these new connection(s) or pipe(s) that the image, from the imaging server (IS) 38 may be transferred from the Home Server (HS) 30 to the e-mail client associated with the user 40, over the Internet 24.

The process moves to block 110, where it is then determined, typically in the Home Server (HS) 30, if there are more requests to be processed. If there are not any more requests to be processed, the process ends at block 112.

If there are more requests to be processed, the process returns to block 106. The next request of the total number or "N" requests is sent, and the process continues from block 106, as described above. The process will repeat until all N requests have been processed, and once all N requests have been processed, the process ends at block 112.

Figure 5A:
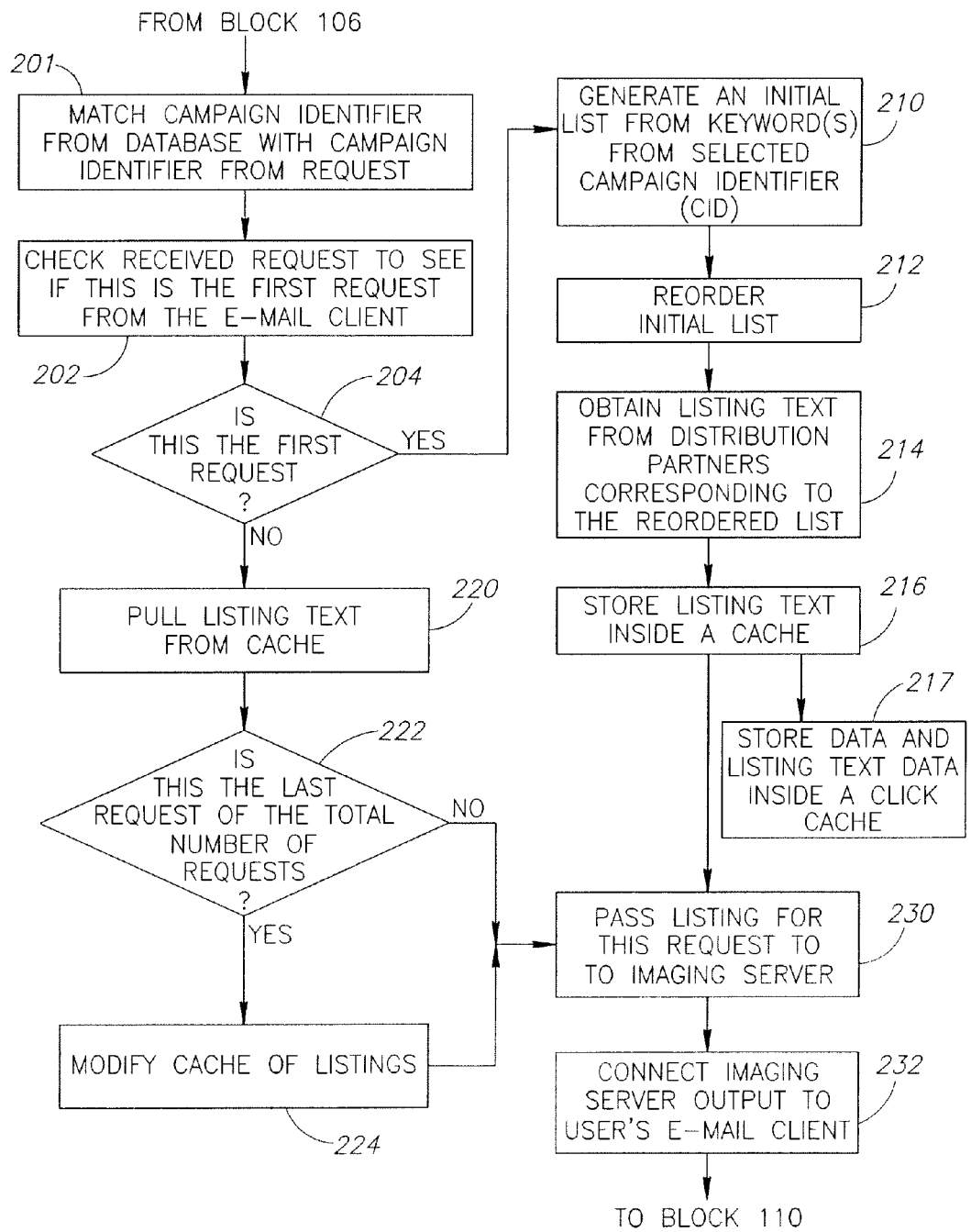
FIG. 5A is a flow diagram of the request processing sub process of FIG. 2.

Attention is now directed to FIG. 5A, that shows a flow diagram of block 108 of FIG. 2, detailing the processing of requests. In this process, requests are processed one at a time, typically on a "first in" basis.

Initially, the Home Server (HS) 30, upon receiving the request, at block 201, matches the campaign identifier in the "sent back" request with a campaign identifier (CID), for example, campaign identifiers CID1 to CIDn, in the database 44 of the cache or database 43'. Once this match is made, the request is analyzed to determine if it is the first request from the e-mail client of the user, at block 202. It is then determined if this request is the first request, at block 204.

In the sub process of block 204, the unique identifier, for example, the mailing address of the user, the campaign identifier, and the mailing identifier, are grouped to define a key at the home server (HS) 30. The key could also be defined in other ways, depending on the rules and policies of the home server (HS) 30. The now created key is queried against all other keys in the cache 43a, known as the key cache, associated with the home server (HS) 30. The definition of what is a match for keys is in accordance with rules and policies programmed into the home server (HS) 30. For example, one definition of "match", as used here, for example may be an exact match of unique identifier, campaign identifier (CID), and mailing identifier.

If a matching key is not found in the key cache 43a, this is the first request, and the process moves to block 210. Accordingly, the key cache 43a is empty of this particular key, and this key is now stored in the key cache 43a, as shown for example, in FIG. 6. All of the requests from each sent e-mail have the same key. Alternately, if a matching key is found, the process moves to block 220.

Figure 6:
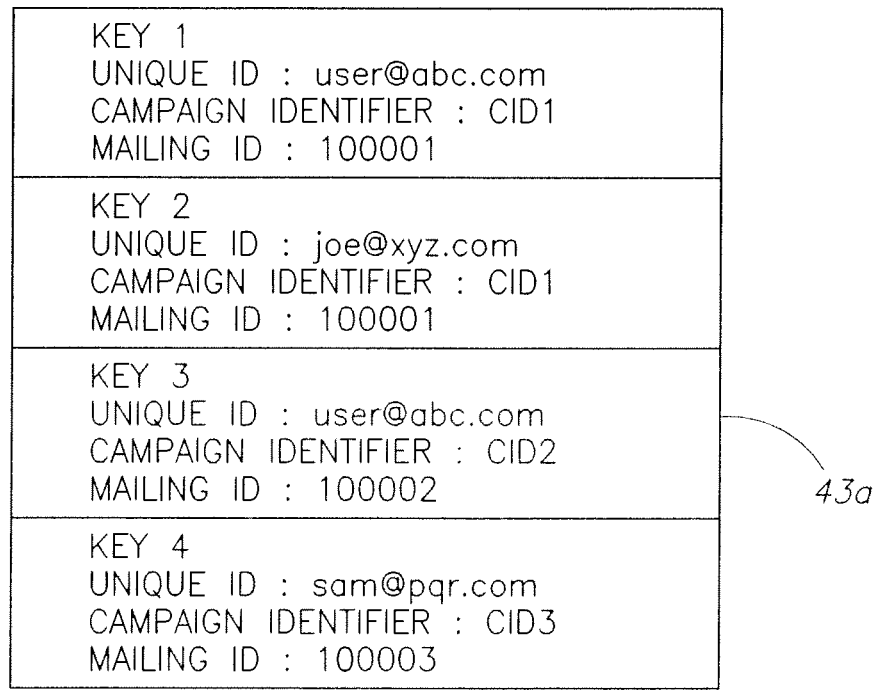
FIG. 6 is a diagram of a key cache in accordance with an embodiment of the invention.

As shown in FIG. 6, keys, indicated by KEY 1 to KEY 4 are unique to each opened e-mail for a particular recipient (user), in accordance with the time each e-mail was opened. For example, the user with a unique identifier (ID) of user@abc.com has opened two different e-mails, whereby he will receive the content corresponding to each specific e-mail, based on the keyword identifiers. Similarly, in FIG. 6, the user "joe@xyz.com" may receive different content than the user "user@abc.com" even though their requests were based on the same campaign identifier, and they received their e-mail in the same batch, at approximately the same time, as indicated by the same mailing identifier, but opened these e-mails at different times.

If the request being processed is the first request, the process is at block 210. The keywords for the matched campaign identifier (CID) are used to generate an initial list of listings from the distribution partners (DP), servers 34a-34n, corresponding to the keyword(s) associated with the campaign identifier. The listings may be ordered in the list in accordance with a predetermined criteria, that may be for example, pay per click (PPC).

FIG. 7A shows an exemplary list, of listings from various distribution partners ordered in accordance with a predetermined criteria, for example, pay per click (PPC). The highest ranked listing is at the top of the list, while the rankings decrease for the listings going downward on the list. For purposes of explanation, Campaign Identifier 1 (CID1) is "VACATIONS", with Keyword 1 (KW1) being "VACATION", Keyword 2 (KW2) being "HOTEL" and Keyword 3 (KW3) being "VACATION TRAVEL." The list includes six listings, for campaign identifier 1 (CID1), with a column for the keyword (KW) (specific keywords are listed with their corresponding label KW1, KW2 or KW3, next to the actual keyword, with KW1, KW2 and KW3 in parenthesis, for explanation purposes, as in an actual application the parentheticals are not listed next to the actual key words) (the same is also true for FIG. 7B), a column for the distribution partner, a column for the pay per click (PPC) amount, and a column for the position of the advertisement data in the server 34a-34n of the requisite distribution partner (DP), indicated as "ADPOS". It should be noted that the actual advertisement positions or rankings are changed by the distribution partners, within their respective servers 34a-34n, at any given time, whereby the advertisement data (advertisements or text) at each position or rank in the respective server 34a-34n may be different at a subsequent time, than at a previous time.

The process then moves to block 212, where the list of FIG. 7A is reordered into the list of FIG. 7B. Reordering of the list may be by any desired formula, and if desired, the reordered list may remain in the same order. The reordered list may include all of the listings of the initial list in a ranked order. However, it is typical that the reordered list includes N listings in a ranked order, the N listings corresponding to the number of positions for dynamically generated links in the requisite template (for example, the template 150 of FIG. 4).

One method of reordering the list may be in accordance with a Distribution Optimization Formula (DOF). The distribution optimization formula for advertisements that will produce maximum revenue (MR) in accordance with the following equation (EQ1—where "·" is the multiplication operator):

$$MR = (PPC\ Price) \cdot (Percentage\ of\ Revenue\ Share) \cdot (1 - click\ attrition) \cdot (CTR) \quad [EQ1]$$

where,

PPC (Pay Per Click, also price per click or cost per click) Price is the price per click that a web site owner, operator or promoter will pay for a user's click on an advertisement that will direct the user's browser to a targeted web site associated with the web site owner, operator, or promoter;

Percentage of revenue share is the percentage of the PPC amount that the home server (HS) 30 operator will receive if the particular from that distribution partner is sent to the user, clicked on, and the user's browser is directed to the targeted web site. This amount is typically established by contract between the distribution partner associated with the server 34a-34n, and the operator of the system (the home server (HS) 30), and is programmed into the home server (HS) 30;

Click Attrition is a factor determined by both the system operator (operator of the home server (HS) 30) and the distribution partner. The click attrition is the number of valid clicks for a link over the total number of clicks on that link. The system operator or the distribution partner may determine that a click is not valid for a reason. For example, it may be determined that the click was fraudulent. Fraudulent clicks may arise, for example, when the click was not generated by a user, but rather a software program, the advertisement or link may have been clicked multiple times, or there may be a fault in the tracking mechanism used by the system operator or the distribution partner. A suitable default value for "click attrition" is 0.2, corresponding to an average click attrition of 20 percent;

CTR is the "click through rate", a function of the relevancy of advertisements delivered to users for a particular keyword. A "click through" occurs when a user clicks on a box over a link, on their computer screen, typically in a communication sent to the user, such that the user's browser (browsing software or browsing application) is directed to a targeted web site, associated with the uniform resource locator (URL) of the link. For example, for the keyword "hiking boots," one distribution partner may have an advertisement stating "Find shoes and boots at Acme auction! Click here" while a second may have an advertisement stating "Visit hikingboots.com for great deals on all styles of hiking boots for the avid outdoorist. Click here." Consumers looking for hiking boots would tend to find the second advertisement more relevant because it is more specific. Keyword distribution partners utilize different technologies and business policies to increase relevancy, which in turn affects the click through rate on any given advertising campaign. Assigning the click through rate is a function of historical experience with a particular keyword partner and knowledge of its technologies and business policies. The higher the click through rate, the more consumers find the advertisement relevant and the greater the likelihood that they will click on it. "CTR" values for EQ1 above, may be defined by the number of clicks for a particular link, divided by the number of sent e-mails that contain the particular link. A default value for "CTR" in EQ1 above, may be 0.001, corresponding to a click through rate of 0.1 percent.

Applying the above Distribution Optimization Formula (DOF) of EQ1 above, for example, produced the ordered list of FIG. 7B. In this list, the maximum revenue for the system (the operator of the home server (HS) 30) will be for the listing having the keyword "HOTEL" of distribution partner 3 (DP3) with a PPC Value of $0.70 at position 1 (ADPOS=1) in the server 34c, of distribution partner 3 (DP3). This listing was originally ranked fourth in the initial ordered list of FIG. 7A. It is now ranked first in the reordered list of FIG. 7B.

Also, the listing originally ranked first in the initially ordered list of FIG. 7A (the listing for the keyword VACATION of Distribution Partner 2 (DP2), with a PPC value of $1.00 at position 1 (ADPOS=1) in the server 34b of DP2) is now ranked second in the reordered list, and now completed list of FIG. 7B. As N=2, based on the template having two positions for dynamically generated links, the reordered list of FIG. 7B only includes the aforementioned two listings.

While the processes of blocks 210 and 212 are performed dynamically, typically in real time, and "on the fly", the processes of blocks 210 and 212 may be performed by an alternate process. This alternate process includes batch mode processing, and is detailed in FIG. 5B, to which attention is now directed.

Figure 5B:
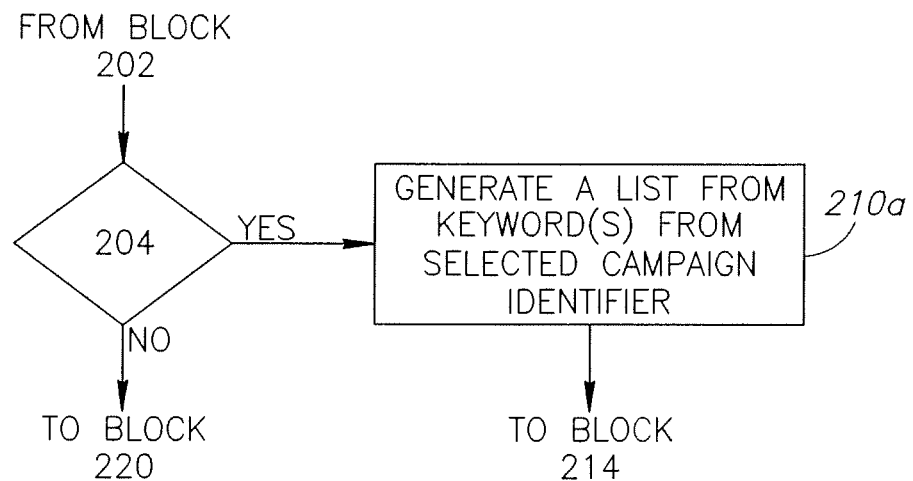
FIG. 5B is an alternate portion of the flow diagram of FIG. 5A.

In FIG. 5B, after block 204, the process moves to block 210a. In block 210a, a list is generated from the keyword(s) from the selected campaign identifiers. Specifically, for each campaign identifier, the home server (HS) 30 obtains the keywords and at regular intervals, and subsequently produces initially ordered lists by polling the requisite servers 34a-34n of the various distribution partners. The system (of the home server (HS) 30, then reorders the list, for example, with predetermined criteria, for example, the distribution optimization formula (DOF), as detailed above, for the particular time interval. The reordered list for the particular time interval, typically has multiple listings, and typically more than two listings.

The reordered list for the now selected campaign identifier (CID), having been sent back to the home server (HS) 30, as part of the returned (sent back) request, is now obtained. The list is typically subjected to truncation, to be truncated to N listings, typically, the top N ranked listings, similar to the creation of the reordered list of FIG. 7B (detailed above). With the necessary list complete, the process moves to block 214, and reference is made back to FIG. 5A.

The listing text (data) corresponding to each listing of the reordered list (for example, a completed list) is then obtained (pulled) from the servers 34a-34n, corresponding to the requisite distribution partners, at block 214. Here, for example, one listing text will be pulled from the server 34c, corresponding to Distribution Partner 3 (DP3), and one listing text will be pulled from the server 34b, corresponding to Distribution Partner 2 (DP2).

The listing text, corresponding to the reordered list, is then stored in a cache, at block 216. The cache is, for example, a listing cache 43c. Here, for example, the reordered lists were truncated to include N ranked listings, these N ranked listings are stored in the listing cache 43c.

The N listings are such that N corresponds to the number of requests in the sent e-mail, as well as the number of positions to be filled in the template 150 (FIG. 4). Also, the number of requests "N" is stored in a request cache, along with a key. A request cache may be, for example, the cache 43b.

Data exchanges, between the Home Server (HS) 30 and the servers (DP) 34a (representative of all servers (DP) of the distribution partners 34a-34n), are typically accomplished via Extensible Markup Language (XML).

The listing text, that is returned to the Home Server (HS) 30 from each respective distribution partner (DP) (the server 34a-34n associated therewith), is assigned a particular key, corresponding to the new key created in the key cache 43a (as a result of a matching key not being found), and includes the top "N" results, in the form of N listings. N is the total number of requests in the originally sent e-mail, as detailed above. Each listing of the listing text typically includes a title or headline for the content (e.g., the advertisement) to be returned to the e-mail client of the user 40, at least one target uniform resource locator (URL) for the server 34a-34n of the requisite distribution partner (or other location designated by the server 34a-34n of the respective distribution partner) one or more servers, and data for the body of the content to be returned. The data for the body of the content to be returned includes data in text form and position data (POS), indicating the location for the data in text form in the template. The aforementioned portions of the listing text can be parsed, in accordance with the process being performed thereon.

The listing text, is now stored in a cache, for example, the listing cache 43c, at block 216. The listing text has a key assigned to it, upon its being stored in the listing cache 43c. This key is linked to a corresponding key, typically in another cache, such as the key cache 43a.

Figure 7C:
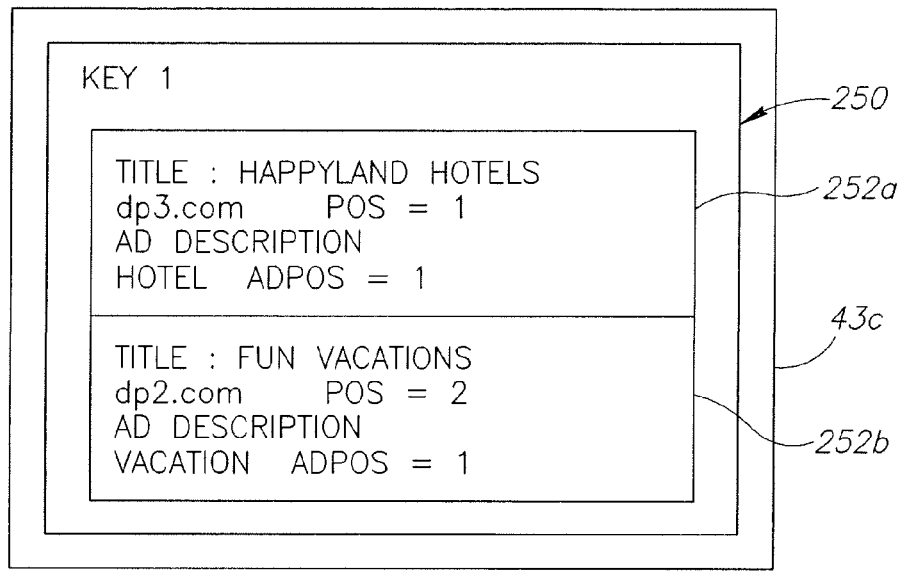
FIG. 7C is a diagram of a listing cache in accordance with an embodiment of the invention.

FIG. 7C shows an exemplary listing cache 43c, where a listing text 250 is stored therein. The listing text 250 includes a key, for example, KEY 1, formed of the unique identifier (ID), for example, user@abc.com, the campaign identifier (CID), for example, CID1, and, the mailing identifier (ID), for example, 100001, as shown in FIG. 6 and detailed above, and N listings, for example, where N=2, listings 252a and 252b. Within each listing 252a, 252b is, for example, a title for a web site associated with the listing (for example, in listing 252a, the title is HAPPYLAND HOTELS), a URL for the distribution partner associated with the listing (for example, in listing 252a, the URL is www.dp3.com), position data (POS=1 or POS=2) indicating the location in the template where the image with the link to the URL of the distribution partner (for example, the server 34a-34n associated with the requisite distribution partner) is to be placed (for example, in listing 252a, the position data is, POS=1), data for the body of the content to be returned is referenced as "AD DESCRIPTION", and the position of the advertisement in the server 34a-34n of the requisite distribution partner (DP), that is for example, referenced as, "ADPOS". The keyword from the campaign identifier (CID), for example in listing 252a, "HOTEL" may also be part of the listing text.

The AD DESCRIPTION is the text to be sent to the imaging server (IS) 38 with the TITLE, to be converted into the requisite image, for placement into the template of the opened e-mail at the requisite position. The listings 252a and 252b are typically placed into the listing text in an order of priority, here, for example, top to bottom or 252a and 252b. Additionally, by storing the listing text in the cache 43c with a unique key, a specific user, for example, the user 40 with the address user@abc.com, will receive listings intended for him at the time he opened the e-mail.

Accordingly, processing of the first request will result in the delivery of the first listing 252a in the form of an image, to the template of the opened e-mail at a position determined by the position data in the first request (for example, at a first position as the position data is POS=1). Similarly, processing of the second request will result in the delivery of the second listing 252b in the form of an image, to the template of the opened e-mail at a position determined by the position data in the second request (for example, at a second position as the position data is POS=2). In general, and in the case of more than 1 request, Processing of the requests until the last or Nth request, and results in delivery of the corresponding nth listing to the last position in the template of the opened e-mail mail, in accordance with the position data, POS=n (as detailed below).

Figure 8:
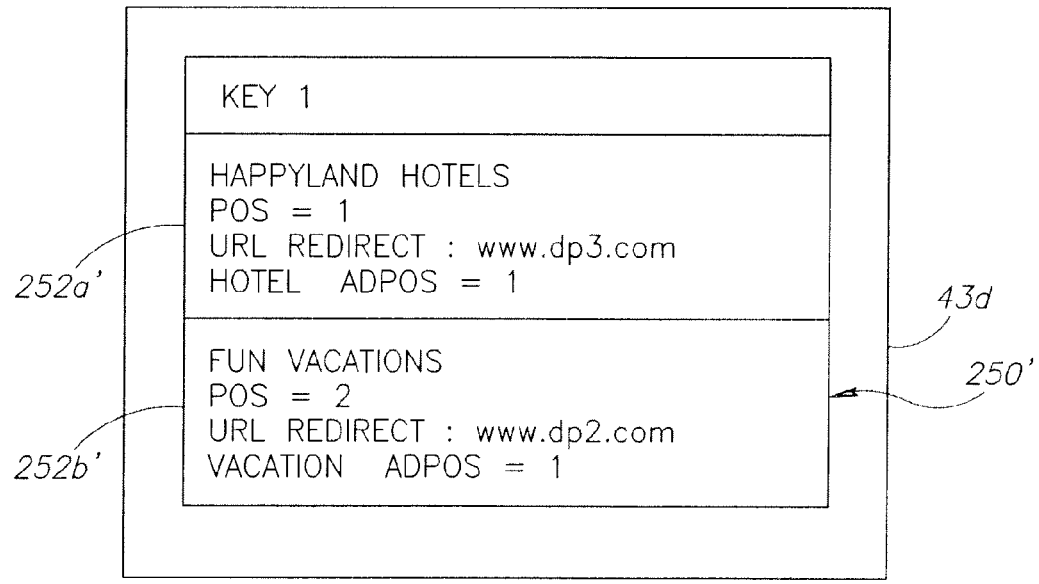
FIG. 8 is a diagram of a click cache in accordance with an embodiment of the invention.

Portions of the listing text, for example, from the cache 43c, are also stored in another cache, for example, a click cache 43d, at block 217. FIG. 8 shows an exemplary click cache 43d, where a listing text 250', corresponding to the listing text 250 of the listing cache 43c, is stored in the click cache 43d. The listing text 250' includes a key, identical to the corresponding key in the key cache 43a, as well as listings 252a'-252b'. Each listing 252a'-252b' corresponds to the listings 252a-252b of the listing text 250. Within each listing 252a'-252b' is, for example, a title for a web site associated with the listing (for example, HAPPYLAND HOTELS in the listing 252a'), a Redirect URL for the server 34a-34n of the requisite distribution partner, associated with the listing (for example, www.dp3.com, in the listing 252a'), and Position Data indicating the location for the resultant image produced from the listing in the template. For example, position data in the listing 252a' is represented as POS=1. There is typically also the advertisement position "ADPOS" for the keyword at the time the listing test was taken, as well as the actual keyword (for example, HOTEL in 252a' and VACATION in 252b'). These two fields are not required, but are typically used for monitoring purposes, by the administrator (system administrator) of the home server (HS) 30.

From block 216, the process moves to block 230, where the listing corresponding to the request number, and accordingly, the position data, is passed from the listing cache 43c of the Home Server (HS) 30 to the imaging server (IS) 38, over the Internet 24.

The imaging server (IS) 38 receives the listing in a text format and converts it into an image (or images). The image (or images) are sent to the user's e-mail client, via the Home Server (HS) 30, at block 232. The image(s) for the listing are rendered to the template in the position corresponding to the position data for the listing. The rendered image is typically paired with one or more links within the template, and, for example, at least one link within each image. The links are planted in the template in such a way that makes the image, or a portion thereof, clickable (activatable by a mouse click). The link includes an underlying URL for the Home Server (HS) 30 in a string with a unique identifier, campaign identifier (CID), mailing identifier and position data. An example string may be as follows:

http://www.homeserver.com/
"uniqueidentifier"&"campaignidentifier"&"mailing identifier"&"positiondata"

The process then moves to block 110 of FIG. 2, to process the subsequent requests. Accordingly, the next request is sent to the home server (HS) 30, at block 106, for processing at block 108. The process returns to block 201 followed by block 202, and returns to block 204.

At block 204, if the received request is not the first request (or "sent back" request) sent from the e-mail client, the process moves to block 220. The request is identified as a subsequent request, as the unique identifier and campaign identifier (CID) from the subsequent sent back request define a key, that will match with a key in the key cache 43a. The now matched key in the key cache 43a, is then used to identify the corresponding listing in the listing cache 43c, and pull (retrieve) the requisite listing text corresponding to the particular request.

The process moves to block 222, where it is then determined if this request, from which the listing text was pulled from the listing cache 43c, is the last request of the total number of requests. This is accomplished by the following sub process.

Initially, in the e-mail sent to the e-mail client (the "sent e-mail"), the number of requests (N) in the e-mail, in particular the position data of the e-mail, has been stored in a cache, for example, the request cache 43b. The position data is associated with a key for each sent e-mail, as stored in the request cache 43b. The number of requests needing to be serviced for each sent e-mail corresponds to the number of listings returned from the requisite content server (CS) 34a-34n, for example the server 34a-34n of the requisite distribution partner (DP), here for example, Distribution Partner 3 (DP3) and Distribution Partner 2 (DP2). For the first request serviced, a reference counter in the Home Server (HS) 30 has been decremented by one (for example, N−1). For each subsequent request that is serviced, the reference counter is again decremented by one. Decrementing continues, until the reference counter reaches zero (for example, N=0), when the last request has been processed.

Accordingly, in block 222, if the request is not the last request, the reference counter has a value of greater than zero (for example, N>0). The process moves to block 230.

In block 230, the next listing of the listing text (in text form) corresponding to the specific request, is pulled from the listing cache 43c, and is passed from the Home Server (HS) 30 to the imaging server (IS) 38. The process then moves to block 232, as detailed above.

However, if at block 222, the request is the last request, the reference counter has been decremented to have a value of zero (N=0). The process moves to block 224. The listing text in the listing cache 43c is modified.

Modification typically occurs after the last request of the total number of requests (from block 104) has been received and processed. Modification of the listing cache 43c of listings therein typically involves deleting the listing text from the listing cache 43c.

This sub process is typically timed, such that once the final listing from the listing cache 43c for this last request has been passed to the imaging server (IS) 38, from the Home Server (HS) 30, at block 230, the listing text is modified in the listing cache 43c. The modification typically includes deleting the listing text from the listing cache 43c in a time period, for example, approximately three hours from the time the first request of the total number of requests or N requests was processed.

With the process now at block 230, the final listing from the listing text is pulled from the listing cache 43c, in response to this last request, and is passed to the imaging server (IS) 38, as detailed above. Once the listing (in text form) has been passed to the imaging server (IS) 38, the process moves to block 232, and back to block 110 (FIG. 2), as detailed above. Since the last request (for example, the Nth request) has been processed, in FIG. 2, the process moves to block 112, where the entire content for the e-mail has now been rendered to the e-mail client of the user 40, for placement into the now-opened e-mail.

Figure 9:
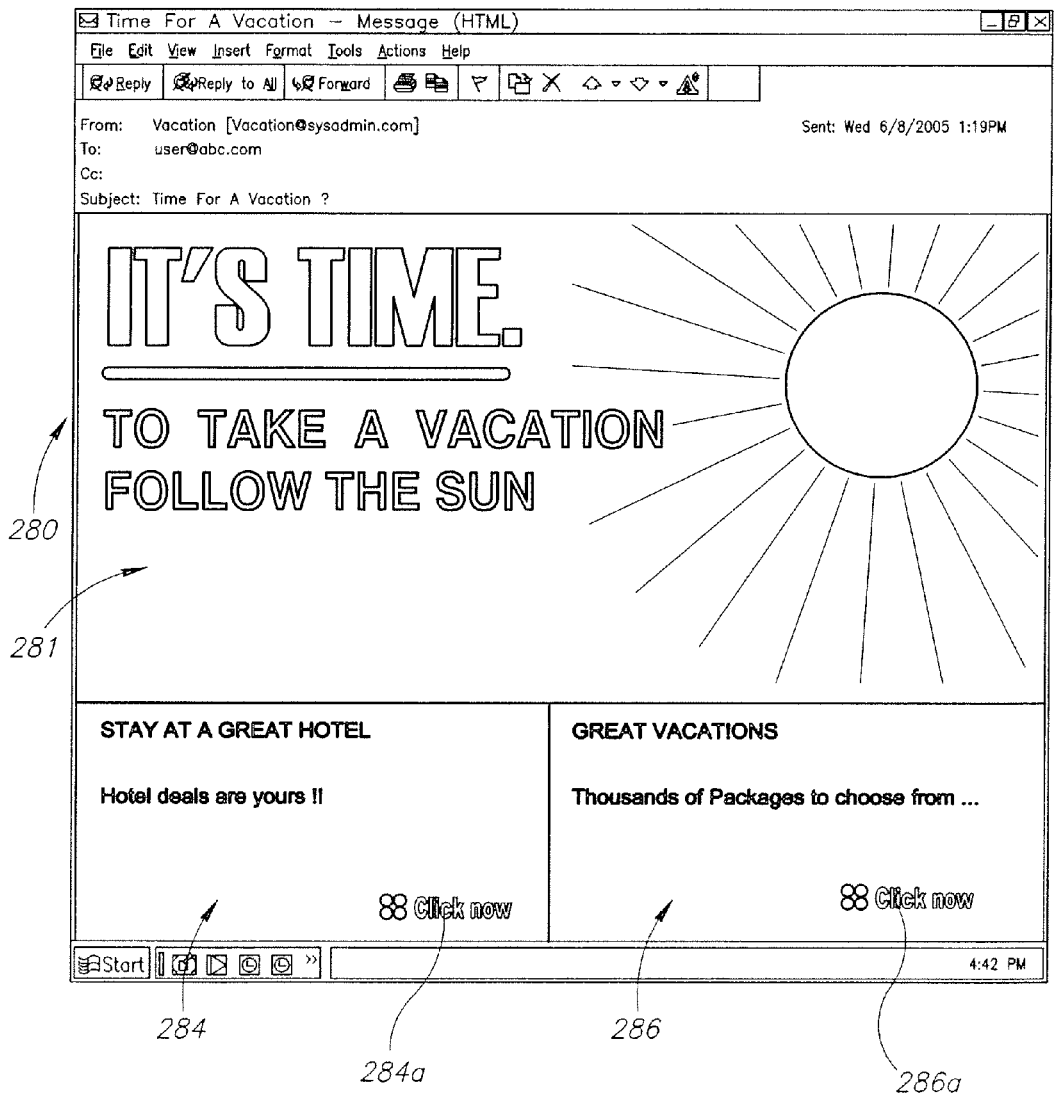
FIG. 9 is a screen shots of an opened e-mail, received in accordance with the present invention.

Attention is now directed to FIG. 9, that shows screen shots of an exemplary e-mails 280, opened by an intended user, for example the user 40, at a first time $t_1$. The e-mail is based on the example template 150 of FIG. 4.

The example e-mail 280 is based on a sent e-mail with two requests (N=2). Accordingly, the listing text returned from the requisite servers 34a-34n of the distribution partners, and stored in the listing 43c and click 43d caches, typically includes only two listings. In the e-mails 280, the images 281, for the section S1 151 of the template 150, includes an image of an advertisement. The image 281 is a static images, of a fixed content formed prior to the e-mail being sent. The images 284, 286, for sections D1 161 and D2 162 of the template 150, were assembled when the e-mail was opened (in accordance with the processes detailed herein and as described in commonly owned U.S. patent application Ser. No. 10/915,975 and U.S. Patent Application Publication No. US 2005/0038861 A1).

These images 284, 286, include portions 284a, 286a that cover links for the user to click on, and are indicated as such, for example, "Click now". (The portions 284a, and 286a are hereafter referred to as links). These underlying links, when activated, typically by a mouse click, ultimately provide the browser of the user 40 with a redirect URL, directing the browser to a server 34a-34n of the distribution partner for the corresponding listing text (advertising data or text).

The links 284a, 286a include underlying strings. As detailed above, each string typically includes a URL for the Home Server (HS) 30 (www.homeserver.com) and data, typically in a string. The data typically includes a unique identifier, a campaign identifier, a mailing identifier, and position data, with the unique identifier, campaign identifier (CID) and mailing identifier being used to define a key (as detailed above). An example string, as detailed above, may be as follows:
http://www.homeserver.com/
"uniqueidentifier"&"campaignidentifier"&"mailing identifier"&"positiondata"

Activating the link, for example, by a mouse click, directs the user's browser to the Home Server (HS) 30. From the data in the string, a click cache 43d may be accessed. By accessing the click cache 43d, the browser receives a redirect URL for a server 34a-34n of a distribution partner (that is targeted) corresponding to the image from the cached listing, as detailed below.

The resultant e-mail 280 opened at a first time ($t_1$), includes an image 281 of an advertisement, that is static, as the section S1 151 of the template 150 (FIG. 4). The images 284, 286, for sections D1 and D2 of the template 150, that were assembled when the e-mail was opened, include links 284a, 286a. These links 284a, 286a will redirect the user's web browser (browsing application) to the corresponding redirect URLs for the requisite servers 34a-34n of the distribution partners, that, in turn, correspond to the listings that resulted in the images, obtained at this time ($t_1$).

Figure 10:
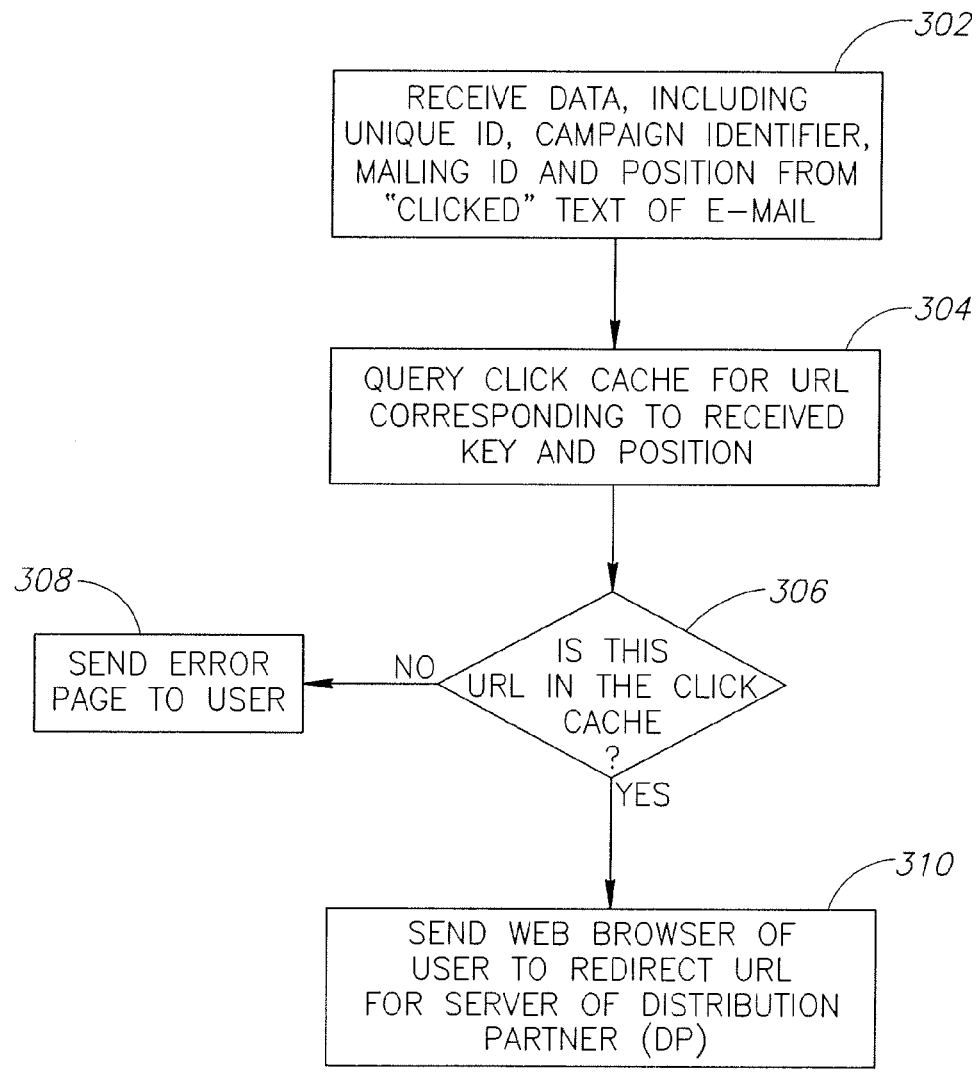
FIG. 10 is a flow diagram of a process for directing an e-mail recipient to an intended web site upon responding to an e-mail in accordance with an embodiment of the invention.

FIG. 10 shows a flow diagram of a process or method in accordance with another embodiment of the invention. This process may be a second phase of the larger process, where the user reaches the server 34a-34n of the distribution partner. The server 34a-34n of the distribution partner is typically programmed to redirect the browser of the user to a web site (or web page) (target web site or target web page) of the actual provider, for example, the advertiser or information provider, of the time-relevant text.

Initially, the user, now having received the rendered images in the template for the now-opened e-mail, will "click" on an image 284, 286 or portion thereof, that supports a link, such as the links 284a, 286a of FIG. 9, to which reference is now also made. Each link, as discussed above, is associated with a string, that includes the URL of the Home Server, and plus a unique identifier, campaign identifier, mailing identifier and position data.

At block 302, the Home Server (HS) 30 receives a unique identifier, campaign identifier (CID), mailing identifier and position data (for the image location), typically in the above-described string, as a result of links 284a, 286a of the text 284, 286 being clicked by the user 40 (activating their mouse 51, as shown in FIG. 1, at the desired link 284a, 286a). The Home Server (HS) 30 then creates a key from the unique identifier, the campaign identifier (CID), and the mailing identifier, and locates the matching key in the key cache 43a. With the matching key located, the corresponding key in the click cache 43d is located. The click cache 43d is queried for position data matching the position data of the string (of the link), in order to obtain a redirect URL for the particular position data, at block 304. It is then determined if the redirect URL is in the click cache 43d, at block 306.

The redirect URL is a URL for the requisite server 34a-34n of the distribution partner, corresponding to the clicked text portion on the rendered e-mail, as programmed into the listed text in the click cache 43d, for the corresponding position (POS). Typically, the server 34a-34n of the distribution partner (DP), will then redirect the user's browser to the target web site or web page on (or hosted by), for example, a third party server (TPS) 42a-42n. The targeted web site corresponds to the advertisement for the listing that was clicked.

Figure 11:
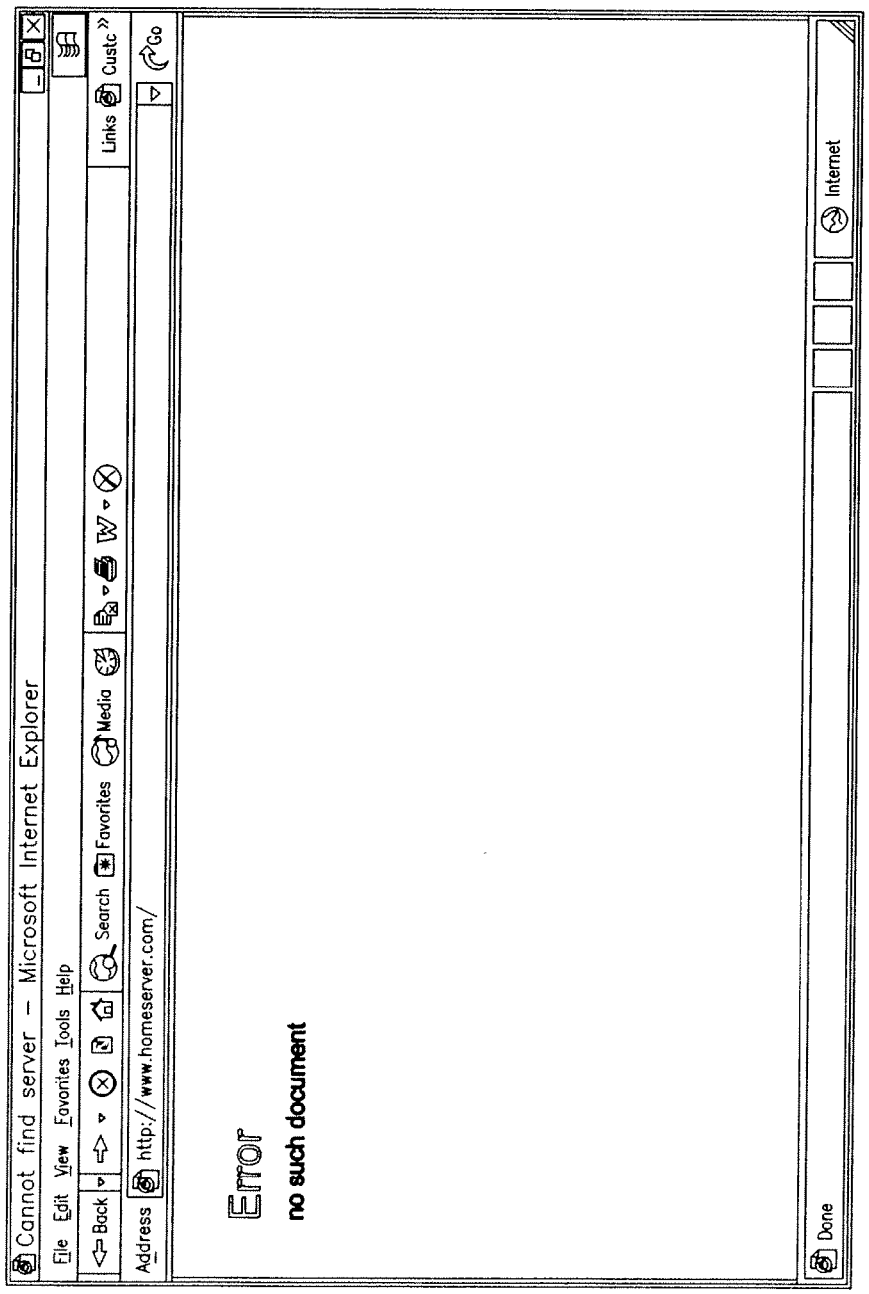
FIG. 11 is a screen shot showing an error or time out.

If the redirect URL is not in the click cache 43d, the user 40 is sent an error page, at block 308. This error page appears on the monitor 48 of the user 40 as, for example, the screen shot shown in FIG. 11.

However, if the redirect URL is in the click cache 43d (with the matching position data), the Home Server (HS) 30 sends the web browser of the user 40 the redirect URL at block 310. The user's web browser receives this redirect URL, and automatically directs the user's browser to access the requisite server 34a-34n of the requisite distribution partner. Typically, the server, that is the requisite server to be accessed, is the same server 34a-34n as that from which the listing was pulled (by the home server (HS) 30). However, the requisite server may be any other server associated with the distribution partner, different from the server 34a-34n, from which the listing was pulled.

For example, the redirect URL (from KEY 1, position data POS=1 in the example click cache 43d of FIG. 8) may be "www.dp3.com." In this case, the user's web browser would be directed to the distribution partner's server, for example, www.dp3.com, corresponds to the server 34c. The server 34c typically includes software, hardware and combinations thereof, that would analyze the incoming data associated with the user's redirected browser, and further redirect the user's browser to the targeted web site associated with the clicked link, here for example, an advertisement for Happyland Hotels, with the URL, for example, www.happylandhotels.com.

Figure 12:
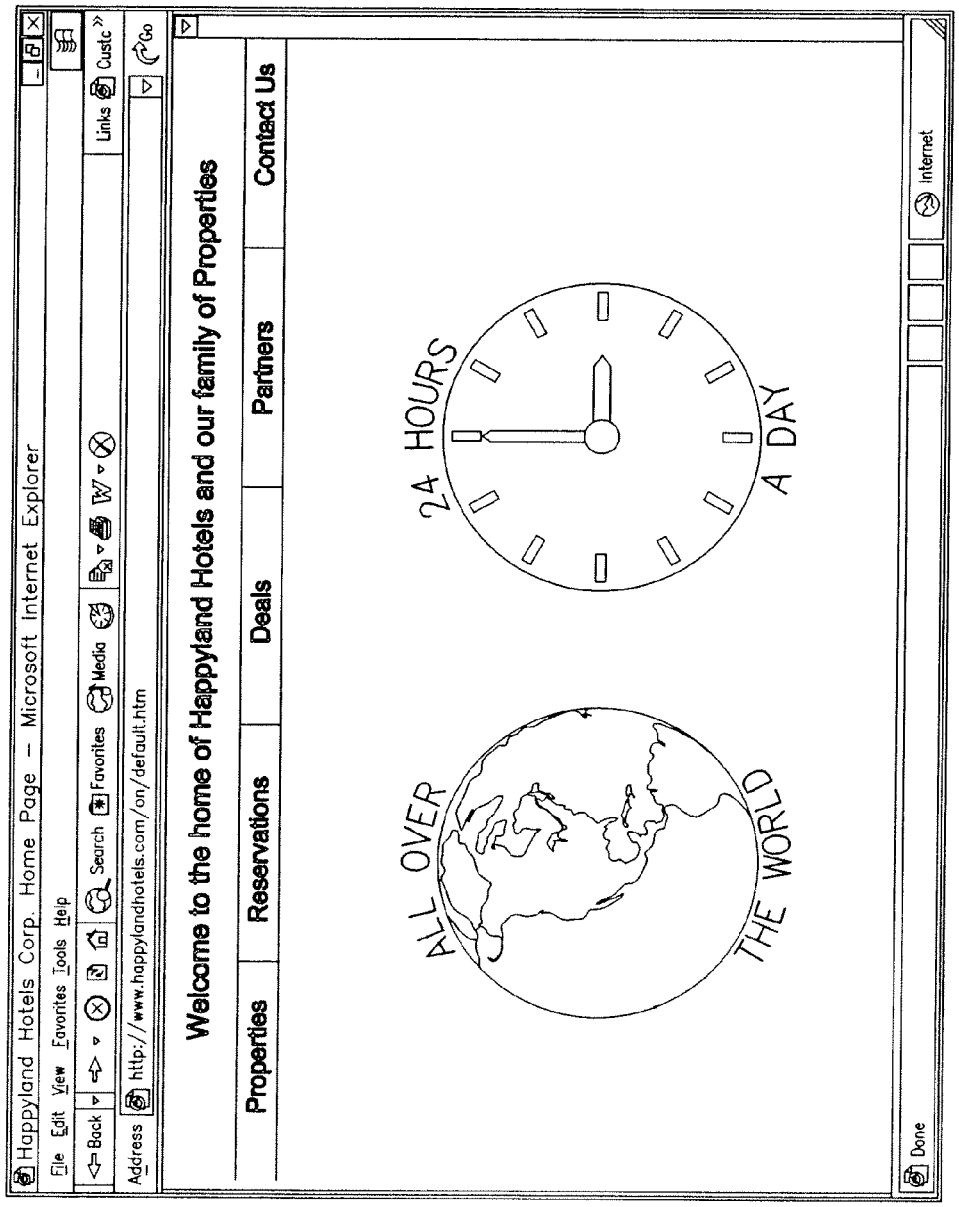
FIG. 12 is a screen shot showing a web page accessed from a redirect uniform resource locator in accordance with an embodiment of the invention.

Accordingly, the distribution partner's server 34c receive the data from the click cache 43d. It would match this data with data stored for the matched keyword and position of the advertisement or information, and in this case would obtain the redirect URL for Happyland Hotels (www.happylandhotels.com). The server 34c would then direct the user's browser to the URL www.happylandhotels.com, whose web site may be hosted by a third party server, for example, server 42a, any one or more of the third party servers (TPS) 42a-42n. Once the user's browser is redirected to this web site, a web page for the web site, for example the home page for Happyland Hotels, as shown in FIG. 12, would appear on the monitor 48 of the user.

The click cache 43d is typically designed to expire in a time period that is less than the limit redirect timeouts (described for block 224 above). This time may be, for example, approximately two hours.

While the above disclosed processes, methods and systems have been illustrated with e-mail, this is exemplary. The above disclosed processes, methods and systems are also suitable for use with banners (graphic images that overlay a displayed web page, and are commonly in the form of pop-ups, buttons, roll-ups, and other similar on-screen displayed graphics) and other electronic communications with one or more campaign identifiers, similar to that for the e-mails disclosed above.

Similar to the e-mail functionalities listed above, the home server (HS) 30 may also be configured to include an architecture for supporting banners and other electronic communications. The architecture includes components, modules and the like, for handling banners, to perform banner server functionality, including banner applications.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A computer-implemented method for providing content to electronic communications over a computer network, comprising:

receiving, by a main server of a content providing system, a content request transmitted over the computer network from a computer associated with at least one user who has activated an electronic communication on the computer of the at least one user, the transmitted content request including an identifying term including a campaign identifier, the main server linked to the computer network;

obtaining, by the main server, based on the identifying term in the received content request, data of informational items from inventories of data of informational items, from distribution partner computers linked to the computer network;

determining, by the main server, an amount of revenue for the content providing system associated with each obtained data of each informational item; and providing, by the main server, to the electronic communication, after the electronic communication has been activated on the computer associated with the at least one user, content based on at least one of the obtained data of an informational item, the content including a link to a data object associated with the informational item, the link being activatable;

wherein the providing the content based on at least one of the obtained data of an informational item, includes selecting the obtained data of an informational item that will yield an amount of revenue for the content providing system, the amount of revenue determined by applying a distribution optimization formula for each informational item, wherein the distribution optimization formula is:

$$MR = (PPC\ Price) \cdot (Percentage\ of\ Revenue\ Share) \cdot (1 - click\ attrition) \cdot (CTR)\ where,$$

MR is the maximum amount of revenue for the informational item;

PPC is a Pay Per Click amount;

Percentage of revenue share is the percentage of the PPC amount that the content providing system receives for the informational item;

Click Attrition includes a default value of 0.2, corresponding to an average click attrition of 20 percent; and, CTR is the click through rate.

2. The method of claim 1, wherein providing the content based on at least one of the obtained data of an informational item includes converting the at least one of the obtained data into an image by an imaging server linked to the computer network, and rendering the image to the electronic communication, after the electronic communication has been activated.

3. The method of claim 1, additionally comprising:

directing, by the main server, the browsing application of the computer associated with the at least one user to the data object, upon activation of the link of content of the activated electronic communication.

4. The method of claim 3, wherein the at least one data object includes a web site.

5. The method of claim 1, wherein the electronic communication includes an electronic mail.

6. The method of claim 1, wherein the identifying term includes a key word.

7. The method of claim 1, wherein the campaign identifier is related to at least one keyword.

8. The method of claim 1, wherein the data of informational items includes the link to the data object.

9. The method of claim 1, wherein the informational items include advertisements.

10. The method of claim 1, wherein the main server includes one or more servers.

11. A computerized content providing system, for providing content to electronic communications over a computer network, comprising:
- a data storage unit having stored thereon data of informational items and identifying terms associated with each of the data of each informational item; and
- a system computer of the computerized content providing system coupled to the data storage unit, that is configured to:
  - receive a content request transmitted over the computer network from a user computer associated with at least one user who has activated an electronic communication on the user computer of the at least one user, the transmitted content request including an identifying term, the identifying term including a campaign identifier;
  - obtain, based on the identifying term in the received content request, data of informational items from inventories of data of informational items, from distribution partner computers linked to the computer network;
  - determining an amount of revenue for the computerized content providing system associated with each obtained data of each informational item; and
  - providing to the electronic communication, after the electronic communication has been activated on the computer associated with the at least one user, content based on at least one of the obtained data of an informational item, the content including a link to a data object associated with the informational item, the link being activatable, wherein the providing the content based on at least one of the obtained data of an informational item, includes selecting the obtained data of an informational item that will yield an amount of revenue for the content providing system, the amount of revenue determined by applying a distribution optimization formula for each informational item, wherein the distribution optimization formula is:

$$MR = (PPC\ Price) \cdot (Percentage\ of\ Revenue\ Share) \cdot (1 - click\ attrition) \cdot (CTR)$$

where,

MR is the maximum amount of revenue for the informational item;

PPC is a Pay Per Click amount;

Percentage of revenue share is the percentage of the PPC amount that the content providing system receives for the informational item;

Click Attrition includes a default value of 0.2, corresponding to an average click attrition of 20 percent; and, CTR is the click through rate.

12. The system of claim 11, wherein the campaign identifier is related to at least one keyword.

13. The system of claim 11, wherein the data of informational items includes the link to the data object.

14. The system of claim 11, wherein the informational items include advertisements.

* * * * *